United States Patent
Popp

(10) Patent No.: US 7,373,041 B2
(45) Date of Patent: May 13, 2008

(54) OPTICAL ROTARY COUPLING

(75) Inventor: Gregor Popp, Munich (DE)

(73) Assignee: Schleifring und Apparatebau GmbH, Fuerstenfeldbruck (DE)

( * ) Notice: Subject to any disclaimer, the term of this patent is extended or adjusted under 35 U.S.C. 154(b) by 0 days.

(21) Appl. No.: 11/469,004

(22) Filed: Aug. 31, 2006

(65) Prior Publication Data

US 2007/0053632 A1 Mar. 8, 2007

(30) Foreign Application Priority Data

Aug. 31, 2005 (DE) .................. 10 2005 041 547
Mar. 10, 2006 (DE) .................. 10 2006 011 526

(51) Int. Cl.
*G02B 6/26* (2006.01)
*G02B 6/34* (2006.01)

(52) U.S. Cl. .......................... 385/26; 385/36

(58) Field of Classification Search ................... 385/25, 385/26, 36

See application file for complete search history.

(56) References Cited

U.S. PATENT DOCUMENTS

| 4,872,737 | A | 10/1989 | Fukahori et al. | |
|---|---|---|---|---|
| 5,568,578 | A | 10/1996 | Ames | |
| 6,782,160 | B2* | 8/2004 | Townsend et al. | 385/25 |
| 7,142,747 | B2* | 11/2006 | Oosterhuis et al. | 385/26 |
| 2004/0017984 | A1 | 1/2004 | Thiele et al. | |
| 2005/0119529 | A1 | 6/2005 | Farr et al. | |

FOREIGN PATENT DOCUMENTS

| AT | 140603 | 2/1935 |
|---|---|---|
| AT | 410603 | 6/2003 |
| DE | 1300002 | 7/1969 |
| DE | 74062 | 6/1970 |
| DE | 1772492 | 2/1972 |
| DE | 69704783 | 11/2001 |
| DE | 60019966 | 2/2006 |
| GB | 2005044 | 4/1979 |
| JP | 02113213 A * | 4/1990 |
| WO | 01/98801 | 12/2001 |

OTHER PUBLICATIONS

Hecht, Optik, © 1974 Addison-Wesley Publishing, 8 pages.
Schleifring, "Mikrooptischer Dreguebertrager," 2005, 12 pages.

* cited by examiner

*Primary Examiner*—Sarah Song
(74) *Attorney, Agent, or Firm*—Kevin L. Daffer; Daffer McDaniel, LLP

(57) ABSTRACT

An optical rotary joint comprises means for coupling-in or coupling-out light, and an optical derotating system. The derotating system may be a Dove prism or an Abbe-Koenig prism. In order to improve reflection at a reflecting face or faces of the derotating element, the reflecting faces are coated with an optically transparent material having a refractive index that is lower than the refractive index of the derotating element. In an embodiment the derotating optical element comprises a Dove prism. Light entry and light exit faces of the Dove prism are provided with optical supplementary elements that have an optical index of refraction greater than an optical index of refraction of the Dove prism.

18 Claims, 3 Drawing Sheets

OPTICAL ROTARY COUPLING

PRIORITY CLAIM

This application claims priority to German Application No. 102005041547.4 filed Aug. 31, 2005 and German Application No. 102006011526.0 filed Mar. 10, 2006.

BACKGROUND OF THE INVENTION

1. Field of the Invention

The present invention relates to a device for transmitting optical signals between units that are rotatable relative to each other (a rotary coupling). This is for simultaneously transmitting a plurality of optical signals along a plurality of channels.

2. Description of Related Art

Various transmission systems are known for transmitting optical signals between units that are rotatable relative to each other.

An optical rotary joint for a plurality of channels, comprising a Dove prism, is disclosed in U.S. Pat. No. 5,568,578. In order to attain low attenuation during transmission, low reflection at a reflecting face is necessary, apart from a maintenance of mechanical tolerances, and as good as possible a bundling of light rays by the collimators. This optimization of bundling is not discussed in the mentioned document it is usually achieved with total reflection. For this, a Dove Prism of optically transparent material having a high refractive index is surrounded by air having a substantially lower refractive index.

Furthermore, Abbe-Koenig prisms are known for derotating images. With these prisms too, a deflection of a beam is effected by total reflection at reflecting faces.

Derotating elements of prior art are preferably used in air. However, there are fields of application, for example under high ambient pressure, in which a derotating element must be used in a different medium, such as oil for example. Now for this, the attenuation of a derotating element, caused by reflection at a boundary face between the glass of the prism and the surrounding oil, depends upon the nature and quality (purity) of the oil. Because of fluctuations of the optical properties of the oil, the oil must be assumed to have a higher refractive index when the prism is being dimensioned, to be on the safe side. With this, the angle of reflection of the light beams becomes flatter and the prism must be designed to be longer.

BRIEF SUMMARY OF THE INVENTION

It is the object of the present invention to further develop an optical rotary joint for transmitting optical signals in such manner that a derotating element may be employed also in media other than air, and that attenuating characteristics of the derotating element become substantially independent from the environment. Another object is to dimension the derotating element to be as short as possible. Yet another object is to achieve a lower attenuation during transmission by an improved bundling of light rays passing through the derotating element.

In accordance with the invention, these objects are achieved with an optical rotary joint, comprising: a first coupling unit; a second coupling unit supported to be rotatable relative to the first coupling unit about a rotation axis; at least one derotating optical element made of a first optically transparent medium and disposed between the first coupling unit and the second coupling unit for transmitting light beams between the first coupling unit to the second coupling unit or vice versa, the derotating optical element having at least one reflecting inner face for internally and totally reflecting at least one light beam passing through the derotating optical element; and at least one thin layer of at least one second optically transparent medium provided on an outer surface of the derotating optical element directly adjacent to the at least one reflecting inner face.

In accordance with the invention, these objects are also achieved with an optical rotary joint comprising: at least one first collimator for coupling-on first light waveguides; a second collimator supported to be rotatable with respect to the first collimator around a rotation axis for coupling-on second light waveguides; and at least one derotating optical element disposed in a light path between at least one first collimator and at least one second collimator; wherein the derotating optical element comprises a Dove prism. The light entry and light exit faces of the Dove prism are provided with optical supplementary elements that have an optical index of refraction greater than an optical index of refraction of the Dove prism.

In accordance with the invention, these objects are also achieved with an optical rotary joint comprising: at least one first collimator for coupling-on first light waveguides; a second collimator supported to be rotatable with respect to the first collimator around a rotation axis for coupling-on second light waveguides; and at least one derotating optical element disposed in a light path between at least one first collimator and at least one second collimator; wherein the derotating optical element comprises a Dove prism; light entry and light exit faces of the Dove prism are provided with optical supplementary elements; and a gap is located between the light-entry and light-exit faces and the optical supplementary elements.

BRIEF DESCRIPTION OF THE DRAWINGS

In the following the invention will be described by way of example, without limitation of the general inventive concept, on examples of embodiment and with reference to the drawings.

DETAILED DESCRIPTION OF PREFERRED EMBODIMENTS

Figure 1:
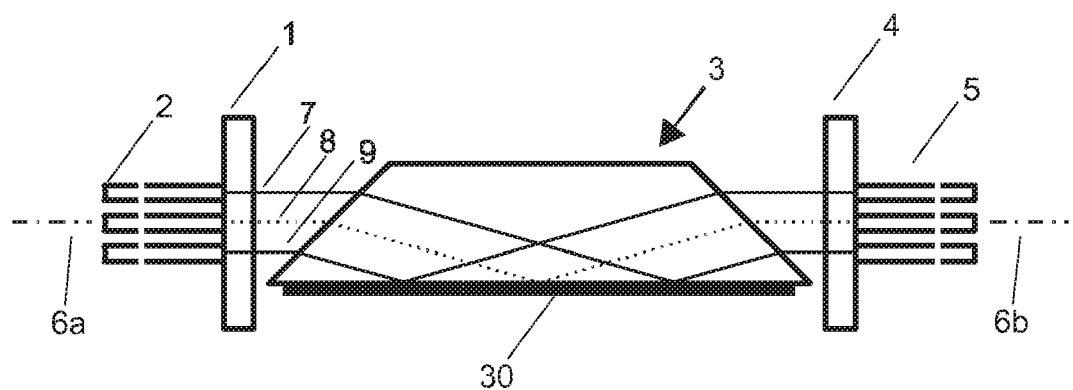
FIG. 1 schematically shows in a general form an arrangement in accordance with the invention.

The optical rotary joint according to the invention comprises at least two coupling units disposed to be rotatable relative to each other about an axis. In an advantageous manner, these coupling units comprise collimators for beam-shaping the light to be transmitted. However, optionally they may also comprise light sources such as lasers, or other light guiding elements such as glass fibers. An optical path for transmitting light is present between at least one first coupling unit and at least one second coupling unit disposed to be rotatable relative to the first. Located in this optical path is at least one derotating element for imaging light sent out from a first coupling unit onto a second coupling unit, and also in the opposite direction, independently from the rotational movement between the two coupling units. A derotating element of this kind may be, for example, a Dove prism or an Abbe-Koenig prism. In the following, a derotating element of a general configuration will also be referred to by using the collective term "prism."

Here the term "collimator" denotes a beam guiding or beam shaping element in the widest sense. The purpose of a collimator of this kind consists of converting the light guided in a light-waveguide, for example a single mode fiber or even a multimode fiber, to a beam path that can be passed through the derotating element. This corresponds to a beam path in free space, or in an optical medium such as, for example, glass or oil. Similarly, a conversion in the opposite direction, i.e. from a beam path in the rotary joint to a light-waveguide, may be effected by means of a collimator. Of course, conversions in both directions within a collimator are conceivable. Signals preferably from single mode light-waveguides, but also other optical signals, in particular from other light-waveguides, or combinations of different signals may be transmitted using the rotary joints in accordance with the invention.

The arrangements in accordance with the invention may be operated basically in both directions, i.e. from the first coupling unit to the second coupling unit or vice versa, but also bi-directionally. In the following, reference will be made also to light-entry faces, coupling-in light etc. to simplify the illustration. It is evident that for a reversed direction of transmission, these terms will relate to the corresponding light-exit faces.

Prisms or derotating optical elements in accordance with the invention consist of optically transparent material, preferably glass. However, any other material that is suitable in accordance with the wavelength to be transmitted, such as for example silicon or Germanium, may be used.

In known prism-like derotating elements, for derotation at least one reflection of a beam path occurs in the prism. The face at which the reflection occurs will here be termed a reflecting face. For example, a dove prism comprises one reflecting face of this kind, whilst an Abbe-Koenig prism has 3 reflecting faces. Typically the reflecting faces are located on the outside of prisms of this kind, or at a transition between the prisms and air.

According to the invention, at least one preferably thin layer of a second optically transparent medium having a refractive index lower than the refractive index of the derotating element is provided close to the outer side of the prism to be locally restricted on at least one reflecting face. Thereby total reflection is made possible at the boundary face. This is now independent from the other surroundings of the prism. Thus the prism may be surrounded by a material having a higher refractive index, or even poorer or changing optical properties. These, however, can no longer affect the transmission. The thickness of the second medium is preferably in the range of less than 10 mm, in particular preferably less than 1 mm. Optically transparent media (here the optical wavelength to be transmitted by the rotary joint is essential for dimensioning) are for example the following materials:

Epoxy-resin adhesive: transmittance of 98% for layer thickness D=0.0254 mm, and 45% for layer thickness D=1 mm.

Acrylate: as used for example as a cladding for optical fibers.

PMMA: transmittance of approx. 98% for layer thickness D=1 mm.

Silicone: transmittance of 95% . . . 99% for layer thickness D=1 mm.

Polysiloxane (also a silicone): coating transmittance of 92% for layer thickness D=3 mm, and 97% for layer thickness D=1 mm.

Basically, materials as disclosed in DE 697 04 783 may be used.

Preferably the second medium has a thickness of 10 to 20 wavelengths of the light to be transmitted. A greater thickness is not necessary, as the light does not penetrate deeper into the second medium because of total reflection.

The second medium preferably may be a coating of the prism with an optically transparent material.

As a second medium, preferably a material is selected with as low as possible a refractive index, so that the angle of total reflection is as large as possible, and with this the constructional length of the prism may be as small as possible.

In another advantageous embodiment of the invention, the prism is coated with another glass or silicon or germanium.

Alternatively, a second medium may be also produced by doping the prism.

In another embodiment of the invention, the second medium comprises a thin glass plate of a kind of glass that is different from that of the prism, and is of lower refractive index. Alternatively, an optional body that lies flat against the prism may be provided.

In another alternative, the second medium comprises a thin film of a material having a lower refractive index, preferably of a synthetic material, or a liquid film. A liquid film of this kind may comprise silicone oil, for example.

In another embodiment of the invention a coating of silicone or a silicone-containing material is provided. Because of the adhesion of the silicone on the glass surface, a plane optical boundary surface is obtained. Silicone typically has a lower refractive index than glass. The second surface of the silicone coating, facing away from the prism, is of no consequence as the light does not penetrate as far as this face because of total reflection.

In an alternative embodiment of the invention, the entire prism is coated on its entire outer surface, or at least on the greater part of the outer surface, with the second medium. A coating of this kind may be produced with simple fabrication methods.

In an advantageous embodiment of the invention the optical rotary joint comprises at least two collimators disposed to be rotatable relative to each other about an axis. An optical path for transmitting light is present between at least one first collimator and at least one second collimator disposed to be rotatable relative to the first. Located in this optical path is at least one derotating element for imaging light sent out from the first collimator onto the second collimator, and also in the opposite direction, independently from the rotational movement between the two collimators. A derotating element of this kind may be, for example, a Dove prism.

As stated above, the term "collimator" here denotes a beam guiding or beam shaping element in the widest sense. The purpose of a collimator of this kind consists of converting the light guided in a light-waveguide, for example a single mode fiber or even a multimode fiber, to a beam path that can be passed through the rotary joint and, in particular, through the derotating element. This corresponds to a beam path in free space, or in an optical medium such as, for example, glass or oil. Similarly, a conversion in the opposite direction, i.e. from a beam path in the rotary joint to a light-waveguide, may be effected by means of a collimator. Of course, conversions in both directions within a collimator are conceivable. A purpose of the invention is the transmission of signals from single mode light-waveguides. However, other optical signals, in particular from other light-waveguides, or combinations of different signals also may be transmitted using the rotary joints in accordance with the invention.

The arrangements in accordance with the invention may be operated basically in both directions, i.e. from the first collimator to the second collimator or vice versa, but also bi-directionally. In the following, reference will be made also to light-entry faces, coupling-in light etc. to simplify the illustration. It is evident that for a reversed direction of transmission, these terms will relate to the corresponding light-exit faces.

As experiments and theoretical considerations have shown, for a given length of a beam path within the rotary joint, a matching of the focal lengths of the collimators must be effected. This is the case irrespective of whether the collimators are designed to be GRIN lenses or spherical lenses or lenses of other shapes. Thus, with an increase of the beam path, the focal length of the collimators also must be increased. For example, with a focal length of 1 mm a length of the beam path of up to 21 mm can be achieved. With greater lengths the attenuation of the signal becomes unacceptable. With a further shortening of the beam path, the focal length of the collimators may also be shortened. A shortening of the focal length of the collimators makes it possible to achieve better bundling with smaller beam imaging errors. Consequently it is also important to keep the length of the beam path in the rotary joint as short as possible. In accordance with prior art, Dove prisms are preferably used with rotary joints. Because of their internal beam paths, these prisms are of relatively large constructional length. Furthermore, the minimum distance of the collimators to the prism is determined by the longest side of the prism.

According to an aspect of the invention, a Dove prism is supplemented by at least one supplementary element that has a larger refractive index than the material of the Dove prism. In an advantageous manner, a suitable supplementary element is disposed on each side of the Dove prism. Suitable supplementary elements may be made of glass in particular, but also of plastics or other optical materials such as silicon or germanium. The Dove prism itself may be of a glass or another optically suitable material, such as, for example, silicon or germanium.

With a normal Dove prism the light entering the Dove prism is deflected by refraction to the longer side, and there mirrored by total reflection. Because of the supplementary element having the higher refractive index, the light entering the Dove prism is now deflected to the other, shorter side and there reflected. This makes it possible to shorten the length of the prism. Thus, this may be also advantageously combined with lenses of shorter focal length.

Particularly because of the use of supplementary elements having an especially high refractive index, further shortening of the prism becomes possible. When mounting a Dove prism in an arrangement according to the invention, as distinct from mounting performed according to prior art, the middle region of the shorter side instead of the longer side must be kept clear of mounting means, because this is now needed for reflection. With a very large reduction of the size of the prism, the angle of incidence on the reflecting face increases, so that total reflection may no longer be possible. In such cases, the reflecting face must be mirror coated. Mirror coating is preferably made by coating with a metal such as gold, and preferably silver.

In an especially advantageous embodiment of the invention, the supplementary elements consist of silicon or germanium, because these have a particularly high refractive index, and therefore the prisms may be built to be short. Similarly, the use of silicon or germanium as a material for the Dove prism would make it possible to reduce greatly the constructional size. However, here it is of substantially greater advantage to use supplementary elements made of silicon or germanium (in combination with a prism made of glass), because substantially less material is needed for the supplementary elements than for the prism itself. The supplementary elements may also comprise other materials. Essential is the use of silicon or germanium in the optical path.

In another advantageous embodiment of the invention, the prism angle of the Dove prism is greater than 45°. Dove prisms normally have a prism angle of 45°. With a larger prism angle, the prism may be further shortened. Thus, for a nominal dimension of 10 mm, a prism of a glass having a refractive index of 1.5 and supplementary elements of silicon may be achieved with a constructional length of 9.5 mm. For this, the prism angle is 64°. If, as distinct from the invention, supplementary elements having a lower refractive index were to be used, then the prism angle would have to be reduced.

In another advantageous embodiment of the invention, at least one supplementary element in accordance with the invention is preferably firmly bonded to the prism by means of an adhesive, for example an epoxy adhesive, or by cementing or welding.

Another embodiment of the invention provides at least one supplementary element according to the invention, which has in combination with the prism a perpendicular entry face for the light beam. Because of the perpendicular light beam, the arrangement becomes independent of the refractive index of the medium surrounding the prism and the supplementary element. Thus, a rotary joint in accordance with the invention may be filled also with a liquid medium, such as water or oil. In order to achieve perpendicular entry faces, a Dove prism having supplementary elements of a lower refractive index than the refractive index of the prism could be used. The supplementary elements with a low refractive index reduce the angle of refraction. Thus, the prism must be dimensioned to be longer. This, contrary to the invention, leads to an inferior embodiment. Whilst in accordance with the invention a Dove prism of a glass having a refractive index of 1.5, and supplementary elements having a refractive index of 1.85, may be achieved with a constructional length of 45.6 mm for a nominal dimension of 10 mm, a prism having a refractive index of 1.85, and supplementary elements having a refractive index of 1.5, requires a constructional length of 66.7 mm. The term nominal dimension here relates to the diameter of a surface to be imaged by the prism.

Furthermore, the material of at least one supplementary element has a coefficient of thermal expansion that is similar, and preferably equal to the temperature coefficient of the prism.

All the embodiments described above may be combined together in one rotary joint.

FIG. 1 shows in a schematic form a cross-section of an arrangement according to the invention. The optical rotary joint according to the invention comprises a first coupling unit with a first collimator 1 for coupling-on light-waveguides 2, and also a second coupling unit with a second collimator 4 for coupling-on further light-waveguides 2. The second collimator 4 is supported to be rotatable relative to the first collimator 1 about the rotation axis 6a, 6b (here also referred to as z-axis). For better illustration, the rotation axis 6 has here been indicated by the two line segments 6a and 6b, and has not been drawn to pass through the entire rotary joint. A derotating element 3 is located in the beam path between a first collimator 1 and a second collimator 4 to compensate the rotary movement. In this example the derotating element is a Dove prism. The beam path is illustrated by the three optical paths 7, 8, 9. Light entering the prism is deflected by refraction in the direction towards the longer side, where it is deflected back into the prism by total reflection, and deflected by a repeated refraction in a direction parallel to the rotation axis of the prism. Thus, the derotated beams once again extend in parallel to the original beams. Now according to the invention, the reflecting side of the prism (here illustrated at the bottom) is provided with a second medium 30 that has a lower refractive index than the prism itself.

Figure 2:
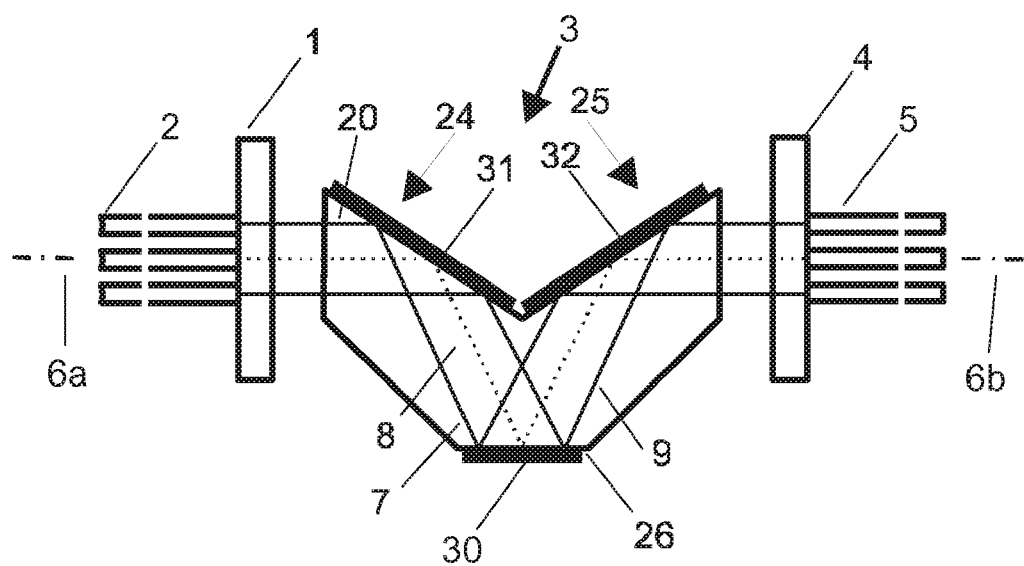
FIG. 2 schematically shows an arrangement with an Abbe-Koenig prism according to a further aspect of the invention.

FIG. 2 shows a rotary joint according to another embodiment of the invention. For this, an Abbe-Koenig prism 20 is used as a derotating optical element 3 for derotation. The derotation is effected here by means of total reflection at the reflecting faces 24, 25 and 26. Now in accordance with the invention, these faces are provided with a second medium 31, 32, 30 that has a lower refractive index than the prism itself.

Figure 3:
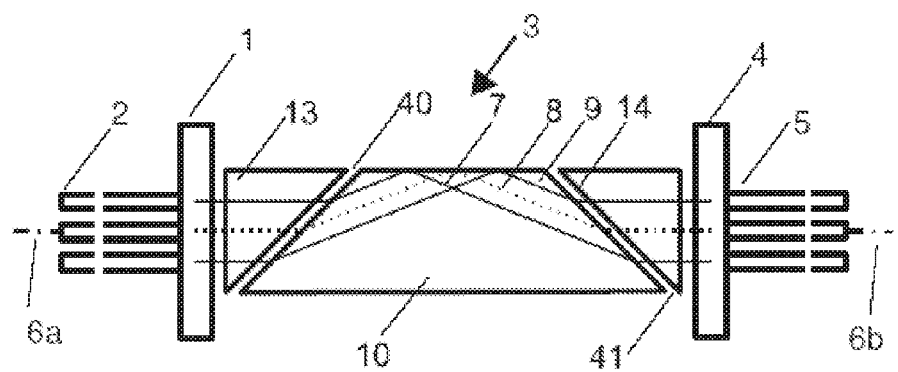
FIG. 3 schematically shows an arrangement of a Dove prism with supplementary elements in accordance with the invention.

FIG. 3 shows a rotary joint according to another embodiment of the invention. The rotary joint comprises a first collimator 1 for coupling-on light waveguides 2, and a second collimator 4 for coupling on further light waveguides 2. The second collimator is supported to be rotatable with respect to the first collimator around an axis of rotation 6a, 6b (here also referred to as a z-axis). For the sake of better illustration the rotation axis 6 has here been indicated by the two line sections 6a and 6b, and has not been drawn to pass through the entire rotary joint. A derotating element 3 is located in a beam path between the first collimator 1 and the second collimator 4 to compensate the rotary movement. The derotating element comprises a Dove prism 10 and two supplementary elements 13 and 14. According to the invention, the supplementary elements consist of an optical medium having a refractive index greater than the refractive index of the Dove prism. Basically, the supplementary elements also may have different refractive indices. However, in an advantageous manner both have the same index of refraction. The light is now deflected to the short side of the Dove prism by the supplementary element, then reflected from this side by total reflection, and refracted by the second supplementary element on the exit side to be again parallel to the original light beam. With this embodiment the length of the Dove prism can be distinctly reduced. Optionally the short side of the Dove prism may be provided with a mirror coating 15. This is particularly necessary when the light is so steeply incident on this side that total reflection is no longer possible. As shown in FIG. 3, gaps 40 and 41 can be located between the light-entry and the light-exit faces. Therefore, gaps 40 and 41 exist between the Dove prism 10 and the optical supplementary elements 13 and 14. According to one configuration, the gap 40 and/or 41 can be filled with optically transparent medium, such as a gas or a liquid. Furthermore, the gap can be adjustable.

Figure 4:
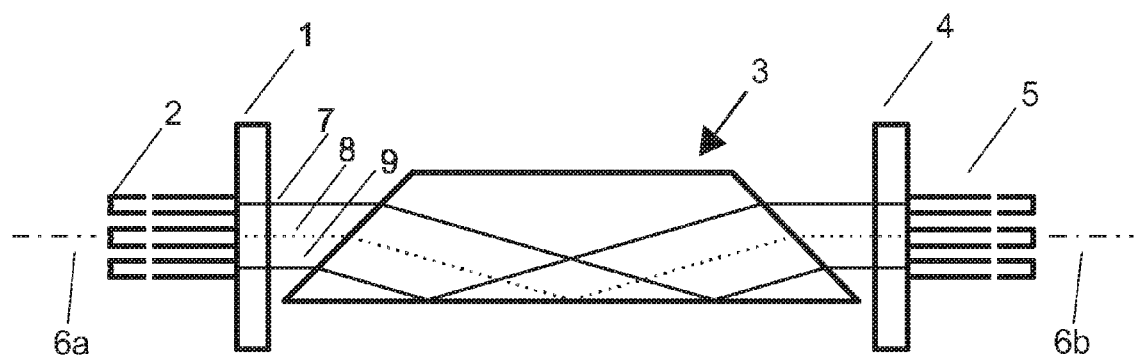
FIG. 4 schematically shows an arrangement of a Dove prism in accordance with prior art.

FIG. 4 shows an optical rotary joint in accordance with prior art. Here the derotating element 3 is a Dove prism. The beam path is illustrated by the three optical paths 7, 8 and 9.

The light entering into the prism is deflected by refraction in a direction towards the longer side, there deflected back into the prism by total deflection, and deflected in a direction parallel to the rotation axis of the prism by renewed refraction. Thus, the derotated beams once again extend in parallel to the original beams.

Figure 5:
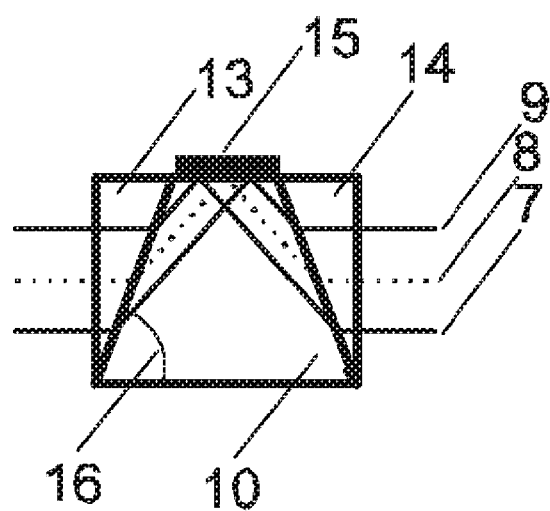
FIG. 5 schematically shows another embodiment of the invention having an enlarged prism angle.

FIG. 5 shows another embodiment having an enlarged prism angle. The prism angle 16 extends between a long side of the prism and an entry face. Usually Dove prisms have prism angles of 45°. Because of the use, in accordance with the invention, of supplementary elements having a larger refractive index, this prism angle may now be increased. Thereby, and in turn, the construction length of the prism may be shortened. In addition, the maximum thickness of the supplementary elements is diminished because of the larger prism angle, which results in a smaller outlay of material and lower cost. The prism shown by way of example and having a prism angle of 64° may be achieved with a construction length of only 9.5 mm. Owing to the steep angle of incidence of the light beams onto the short side of the prism, mirror coating here becomes necessary.

The invention claimed is:

1. An optical rotary joint, comprising:
a first coupling unit;
a second coupling unit supported to be rotatable relative to the first coupling unit about a rotation axis;
at least one derotating optical element made of a first optically transparent medium and disposed between the first coupling unit and the second coupling unit for transmitting light beams between the first coupling unit and the second coupling unit, the derotating optical element having at least one reflecting inner face for internally and totally reflecting at least one light beam passing through the derotating optical element; and
at least one thin layer of at least one second optically transparent medium provided on an outer surface of the derotating optical element, locally restricted as being directly adjacent to only the at least one reflecting inner face.

2. The optical rotary joint according to claim 1, wherein the one thin layer of the at least one second optically transparent medium has a thickness in a range of 10 to 20 wavelengths of light to be transmitted between the coupling units.

3. The optical rotary joint according to claim 1, wherein the at least one thin layer of the at least one second optically transparent medium comprises glass or silicon.

4. The optical rotary joint according to claim 1, wherein the at least one thin layer of the at least one second optically transparent medium is a doped layer of surface glass of the derotating optical element.

5. The optical rotary joint according to claim 1, wherein the at least one thin layer of the at least one second optically transparent medium comprises a thin film of a material having a lower refractive index than the first optically transparent medium.

6. The optical rotary joint according to claim 5, wherein the material is a synthetic material.

7. The optical rotary joint according to claim 5, wherein the at least one thin layer of the at least one second optically transparent medium comprises a thin film of a silicone-containing material.

8. The optical rotary joint according to claim 5, wherein an entire outer surface of the derotating optical element is coated with the at least one second optically transparent medium.

9. The optical rotary joint according to claim 1, wherein the derotating optical element is a Dove prism or an Abbe-Koenig prism.

10. An optical rotary joint comprising:
- at least one first collimator for coupling-on first light waveguides;
- a second collimator supported to be rotatable with respect to the first collimator around a rotation axis for coupling-on second light waveguides;
- at least one derotating optical element disposed in a light path between at least one first collimator and at least one second collimator; and
- wherein the derotating optical element comprises a Dove prism; and
- wherein light entry and light exit faces of the Dove prism are provided with optical supplementary elements that have an optical index of refraction greater than an optical index of refraction of the Dove prism.

11. The optical rotary joint according to claim 10, wherein at least one optical supplementary element comprises silicon in the region of the optical path.

12. The optical rotary joint according to claim 10, wherein at least one optical supplementary element comprises germanium in the region of the optical path.

13. The optical rotary joint according to claim 10, wherein a prism angle is greater than 45°.

14. The optical rotary joint according to claim 10, wherein at least one optical supplementary element is firmly joined to the Dove prism.

15. The optical rotary joint according to claim 10, wherein at least one optical supplementary element comprises a face that is perpendicular to a ray path along a direction of the collimators.

16. An optical rotary joint comprising:
- at least one first collimator for coupling-on first light waveguides;
- a second collimator supported to be rotatable with respect to the first collimator around a rotation axis for coupling-on second light waveguides;
- at least one derotating optical element disposed in a light path between at least one first collimator and at least one second collimator;
- wherein the derotating optical element comprises a Dove prism;
- wherein light entry and light exit faces of the Dove prism are provided with optical supplementary elements; and
- wherein a gap is located between the light-entry and light-exit faces and the optical supplementary elements.

17. The optical rotary joint according to claim 16, wherein the gap is filled with an optically transparent medium such as a gas or a liquid.

18. The optical rotary joint according to claim 16, wherein the gap is adjustable.

* * * * *